United States Patent [19]

Stynes

[11] 4,071,878
[45] Jan. 31, 1978

[54] METHOD FOR PRODUCING CAPACITORS AND CERAMIC BODY THEREFORE

[75] Inventor: James A. Stynes, Lewiston, N.Y.

[73] Assignee: N L Industries, Inc., New York, N.Y.

[21] Appl. No.: 550,828

[22] Filed: Feb. 18, 1975

[51] Int. Cl.² .......................................... H01G 1/147
[52] U.S. Cl. ................................ 361/307; 29/25.42;
29/628; 29/630 R; 361/321; 428/137
[58] Field of Search ............... 317/258, 261; 29/25.42,
29/630 R, 628; 428/137; 264/59; 174/68.5;
361/307, 321

[56] References Cited

U.S. PATENT DOCUMENTS

| 2,919,483 | 1/1960 | Gravley | 317/261 |
|---|---|---|---|
| 3,021,589 | 2/1962 | Weller | 317/261 X |
| 3,260,907 | 7/1966 | Weller et al. | 317/261 X |
| 3,278,815 | 10/1966 | Booe | 317/261 |
| 3,467,898 | 9/1969 | Ruffner | 317/261 X |
| 3,772,748 | 11/1973 | Rutt | 317/261 X |

FOREIGN PATENT DOCUMENTS

| 447,087 | 3/1948 | Canada | 317/261 |
|---|---|---|---|
| 807,480 | 1/1959 | United Kingdom | 317/261 |
| 483,144 | 4/1938 | United Kingdom | 317/261 |

OTHER PUBLICATIONS

IBM Tech. Disclosure by Miller, vol. 10, No. 7, 12/67, p. 941.

*Primary Examiner*—Elliot A. Goldberg
*Attorney, Agent, or Firm*—Ashlan F. Harlan, Jr.

[57] ABSTRACT

A monolithic, multilayer, ceramic capacitor is formed by introducing molten metal into a matrix having thin electrode regions between dielectric strata, through holes, each of which extends through a face of said matrix and provides communication between the outside of said matrix and at least one of said regions, around wires or rods inserted in said holes, thereby providing external leads for said capacitor. A similar process is used to provide internal and external connectors for multilayer, ceramic, circuit boards.

22 Claims, 23 Drawing Figures

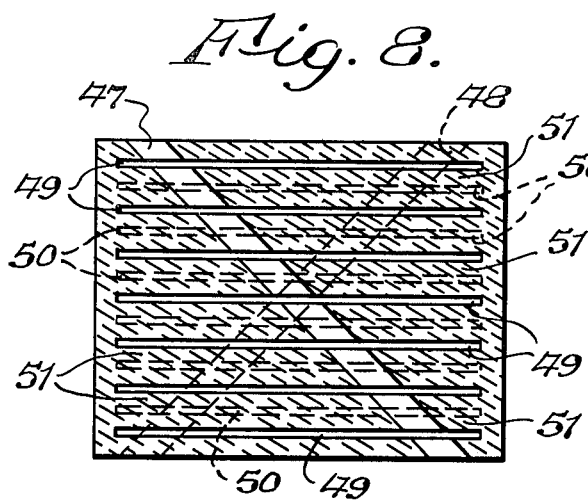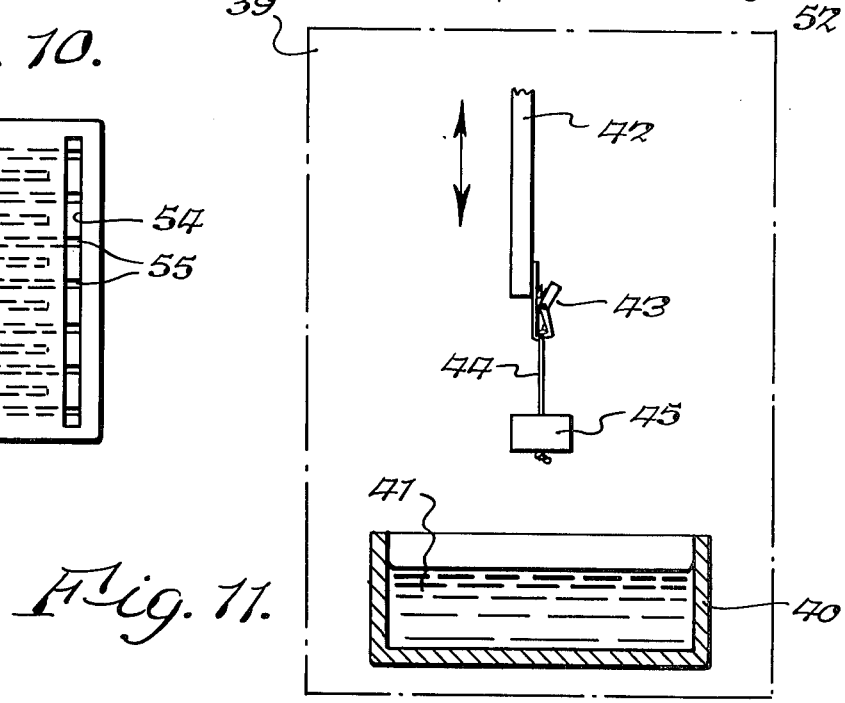

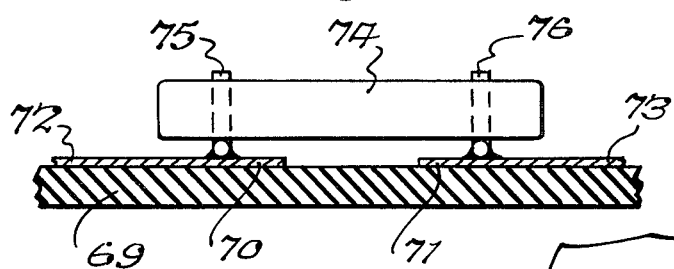
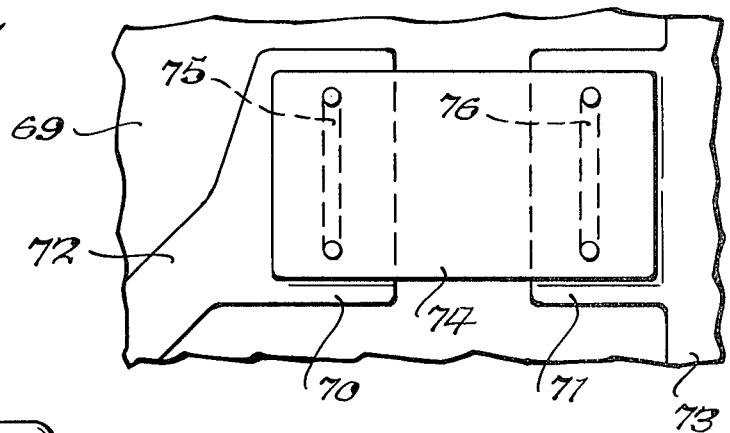
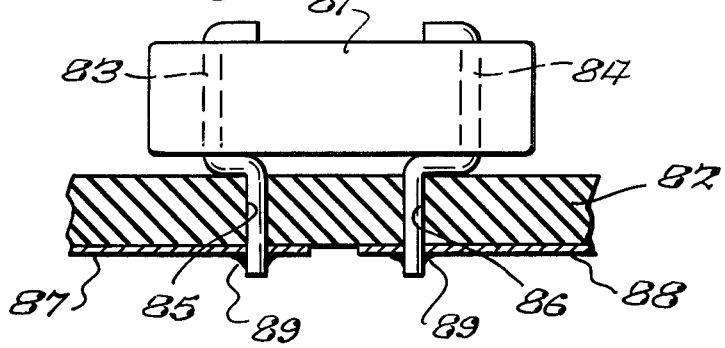
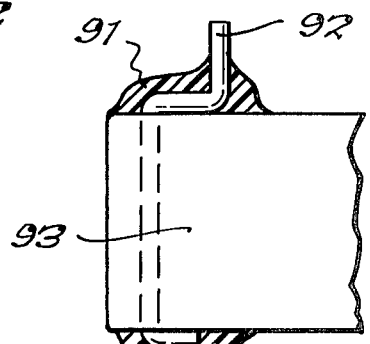
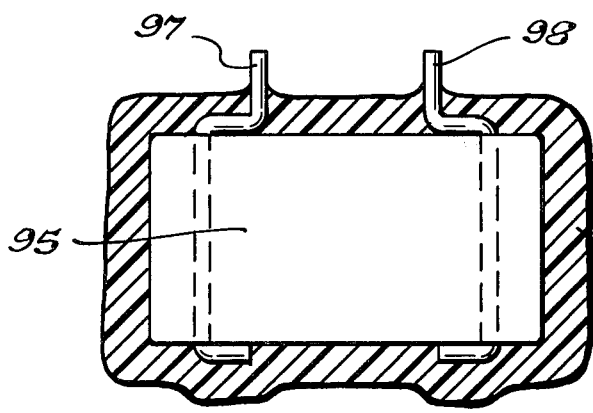
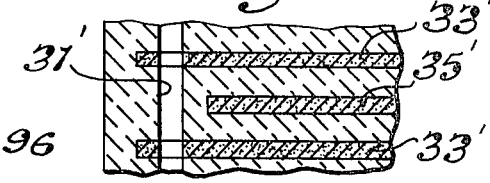
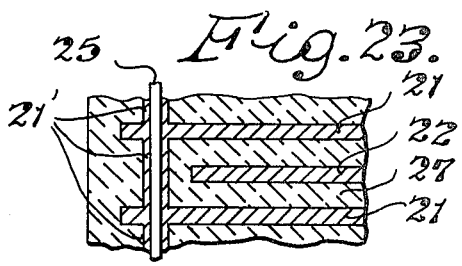

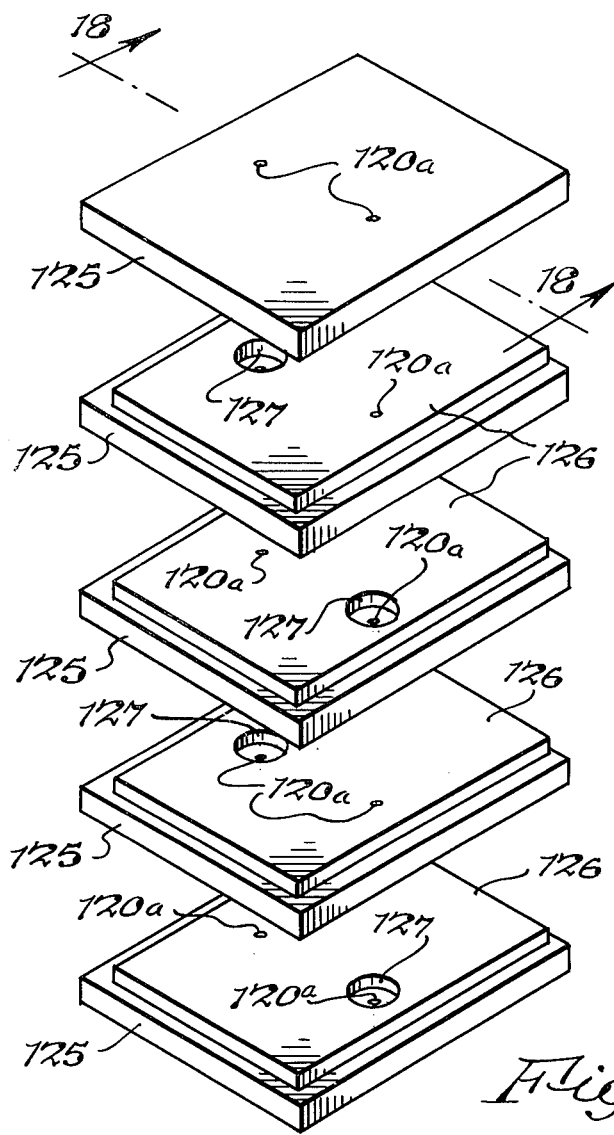
Fig. 17.
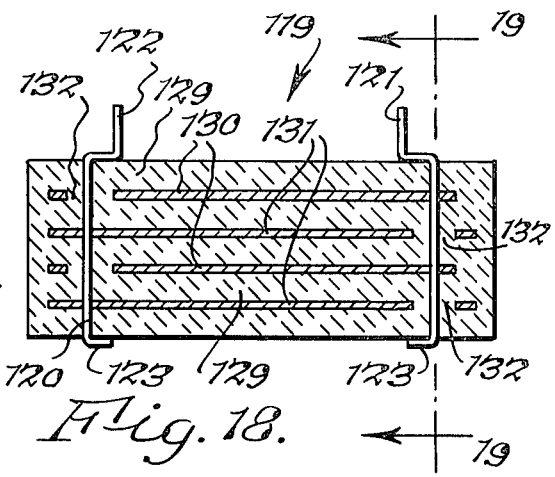
Fig. 18.
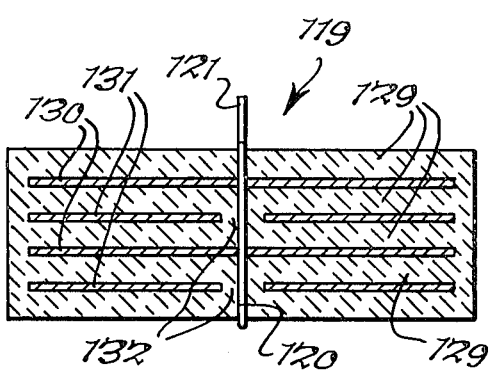
Fig. 19.
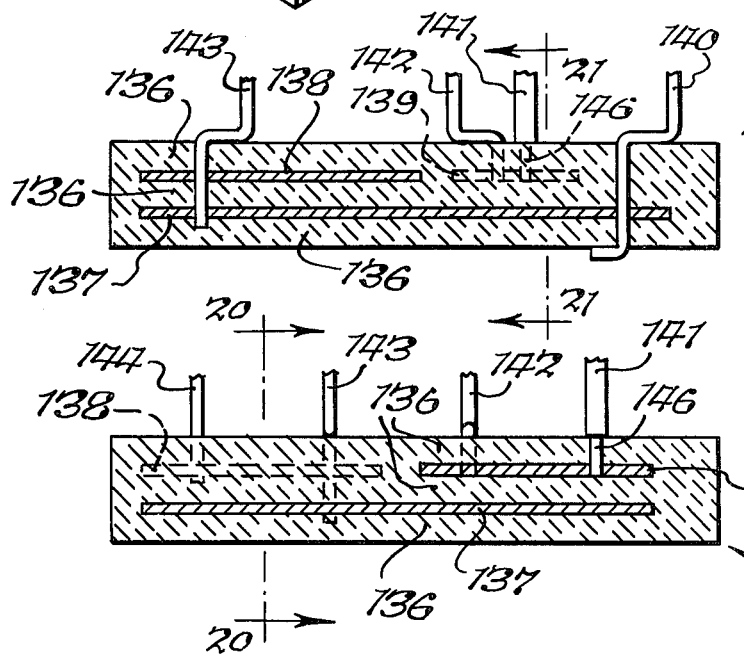
Fig. 20.
Fig. 21.

METHOD FOR PRODUCING CAPACITORS AND CERAMIC BODY THEREFORE

BACKGROUND OF THE INVENTION

Multilayer capacitors are used extensively in electrical circuits. Such capacitors, which comprise a plurality of alternating dielectric layers and conductive layers, the latter serving as internal electrodes, may be formed as rugged monolithic units with a very high capacitance per unit volume. A common procedure for their production comprises the casting of thin sheets of the desired dielectric ceramic composition in finely divided form, using a resin as a temporary bond. Metal-containing electroding paste is then deposited, frequently by a silk screen procedure, in predetermined areas on a plurality of the sheets, a number of electrode areas being produced on each sheet. The thus-coated sheets, after proper orientation and stacking are consolidated by pressure. Individual units are obtained by suitably cutting the green ceramic block of consolidated sheets. These units are subjected to a heating and firing procedure to burn off the combustible binders in the sheets and the electroding layers and to sinter the ceramic material whereby to obtain integral, dense, ceramic-metal structures. When the sheets are properly printed, oriented, stacked, and cut, the several electrode layers in each unit are so arranged that each layer is exposed only at an edge face of the unit and immediately adjacent electrode layers are exposed at opposite edge faces of the unit thus forming two sets of unconnected internal electrodes. Termination electrodes are then applied to the edge faces at which the electrodes are exposed to tie-together alternate internal electrodes electrically.

Since in the above-described process the ceramic and the internal electrodes are co-fired, the metal of the internal electrodes and the ceramic must be compatible at high temperatures, e.g. 1100° C to 1400° C, and the metal must be resistant to oxidation at those temperatures since the best dielectric properties of the ceramic are obtained when the firing is carried out in an oxidizing atmosphere. Consequently, manufacturing costs of such multilayer capaciters are high because high-melting noble metals such as palladium, platinum, and alloys thereof with gold must be used for the internal electrodes.

In U.S. Pat. No. 2,919,483, issued Jan. 5, 1960 to C. K. Gravley, a method is disclosed for producing multilayer ceramic capacitors which does not require the presence of internal metal electrodes while the ceramic is fired to mature it. More recently a method for producing multilayer ceramic capacitors and multilayer ceramic circuit boards using relatively inexpensive metals for internal electrodes has been disclosed in U.S. Pat. No. 3,679,950, issued July 25, 1972 to Truman C. Rutt. The procedure disclosed therein involves forming sintered ceramic units or chips having porous internal strata or layers alternating with dielectric layers, the porous strata being the same size and shape as the conventional noble metal electrodes and being oriented the same, i.e. with immediately adjacent ones having open ends at opposite edge faces of the chips. Metal is then introduces into the porous ceramic strata and termination electrodes are applied, thus forming multilayer capacitors. This method permits the use of such metals as lead, tin, or silver for internal electrodes. A similar procedure is employed in producing multilayer ceramic circuit boards that have internal conductors.

It has been found that a particularly convenient way to introduce metal into the porous strata or layers of ceramic units prepared as described in U.S. Pat. No. 3,679,950 whereby to form internal electrodes therein is by introducing the metal under pressure. However, a problem arises at times because the cooled metal from the metal bath employed may bond together two or more units. It is, therefore, desirable to keep the units separated while metal is introduced, but heretofore no entirely satisfactory method of accomplishing this has been found.

In the production of multilayer ceramic capacitors by prior known methods the provision of end termination has been a problem since an additional firing step is required and the electroding compositions used are expensive.

SUMMARY OF THE INVENTION

It is an object of the present invention to provide means whereby the introduction of metal to form internal electrodes in ceramic bodies produced in accordance with the disclosure of U.S. Pat. No. 3,679,950, and in similar bodies, may be easily, inexpensively, and more efficiently carried out.

It is also an object of the invention to obviate the necessity of providing end termination electrodes for multilayer capacitors.

These objects are achieved by providing each such ceramic unit with one or more leads before the introduction of metal to form electrodes. Normally in producing a capacitor, two holes are provided in each unit, which holes extend through the top and/or bottom ceramic strata and provide communication between the outside of the unit or body and one or more of the electrode regions, between the dielectric strata, that are to be filled with metal, each such hole being so located as to communicate only with alternate ones of such electrode regions. The wires and/or rods forming the leads extend into said holes, which are slightly larger in cross section than the wires or rods, and, preferably, can be withdrawn from the holes only with some effort. The ceramic unit may thus be suspended in and lifted from a metal bath by one or both of said leads. The metal of the bath not only fills the electrode regions between the dielectric strata as disclosed in U.S. Pat. No. 3,679,950, thus forming internal electrodes, but it also fills the spaces around the leads in the holes. As a result wires inserted in said holes can serve as leads for the metal-filled units because each wire is electrically connected to one, and only one, of the two sets of internal metal electrodes.

Since access to the electrode regions between the dielectric strata is obtainable, according to the present invention, through the holes in the ceramic units as described above, the units can be formed without such regions opening, as has been customary, at edge faces of the units. That is, the holes may provide the only access to said electrode regions for the molten metal. However, if desired, holes for leads can be provided in ceramic units that have openings to said regions in edge faces of the units.

It will be understood that the term "electrode region" as used herein is employed rather broadly to designate a region in a ceramic matrix which is provided for and/or contains a conductor or a pseudoconductor such as an electrode or a pseudoelectrode. The term is meant to include not only a porous ceramic stratum having a network of interconnected pores between dielectric ceramic strata such as is disclosed in U.S. Pat. No. 3,679,950, but also a substantially uninterrupted planar space between such strata as disclosed in copending U.S. application Ser. No. 400,242 and a planar space containing one or more pillars between such strata such as is disclosed in copending U.S. application Ser. No. 400,243, now U.S. Pat. No. 3,879,645, granted Apr. 22, 1975.

BRIEF DESCRIPTION OF THE DRAWINGS

FIG. 6 is a fragmentary vertical sectional view of a ceramic body adapted for forming a multilayer capacitor after insertion of a wire lead into the body and before introduction of metal;

FIG. 7 is a fragmentary vertical sectional view similar to FIG. 6 showing a modification in which end terminations are used;

FIG. 8 is a vertical sectional view similar to FIG. 6 showing a modified arrangement of holes for the lead wires;

FIG. 9 is a fragmentary vertical sectional view showing another arrangement for attaching a wire lead to a capacitor;

FIG. 10 is a fragmentary side elevation taken along line 10—10 of FIG. 9, with the wire lead removed;

FIG. 11 is a diagrammatic view showing the manner in which ceramic bodies according to the present invention may be supported for introduction of metal into the electrode regions thereof;

FIG. 12 is a side view of a multilayer capacitor according to the invention mounted on soldering pads of a circuit board (shown broken away);

FIG. 13 is a top plan view of the structure shown in FIG. 12;

FIG. 14 is a side view of a multilayer capacitor according to the invention mounted by the leads thereof through holes in a circuit board (shown broken away);

FIG. 15 is a fragmentary view, partly in section, showing the manner in which the lead wires of a capacitor according to the invention may be sealed;

FIG. 16 is a view, partly in section, of a wholly encapsulated multilayer capacitor according to the invention;

FIG. 17 is an exploded perspective view illustrating another modified form of the invention;

FIG. 18 is a vertical sectional view taken on line 18—18 of FIG. 17 through a multilayer capacitor produced from the elements shown in FIG. 17;

FIG. 19 is a vertical sectional view taken on line 19—19 of FIG. 18;

FIG. 20 is a vertical sectional view, taken on line 20—20 of FIG. 21, through a multilayer circuit board incorporating features of the invention;

FIG. 21 is a vertical sectional view, taken on line 21—21 of FIG. 20.

FIG. 22 is a fragmentary sectional view, similar to FIG. 6 but showing a green body structure; and FIG. 23 is an enlarged, fragmentary sectional view, of a portion of FIG. 5 showing in detail the metal surrounding the wire lead.

DESCRIPTION OF THE INVENTION

In the accompanying drawings several embodiments of the present invention are illustrated on a greatly enlarged scale which varies from figure to figure. It should be noted that the drawings are diagrammatic, at least so far as the number and the thickness of the several layers or strata therein and the size of the leads are concerned. The terms "upper", "lower", "top", "bottom", "right", "left", "above", "vertical" and "horizontal" and similar terms of position and/or direction as used herein refer to the several illustrations but are used only for convenience in description and/or reference. Such terms should not be so construed as to imply a necessary positioning of the structure or portions thereof or as to limit the scope of this invention.

Figure 1:
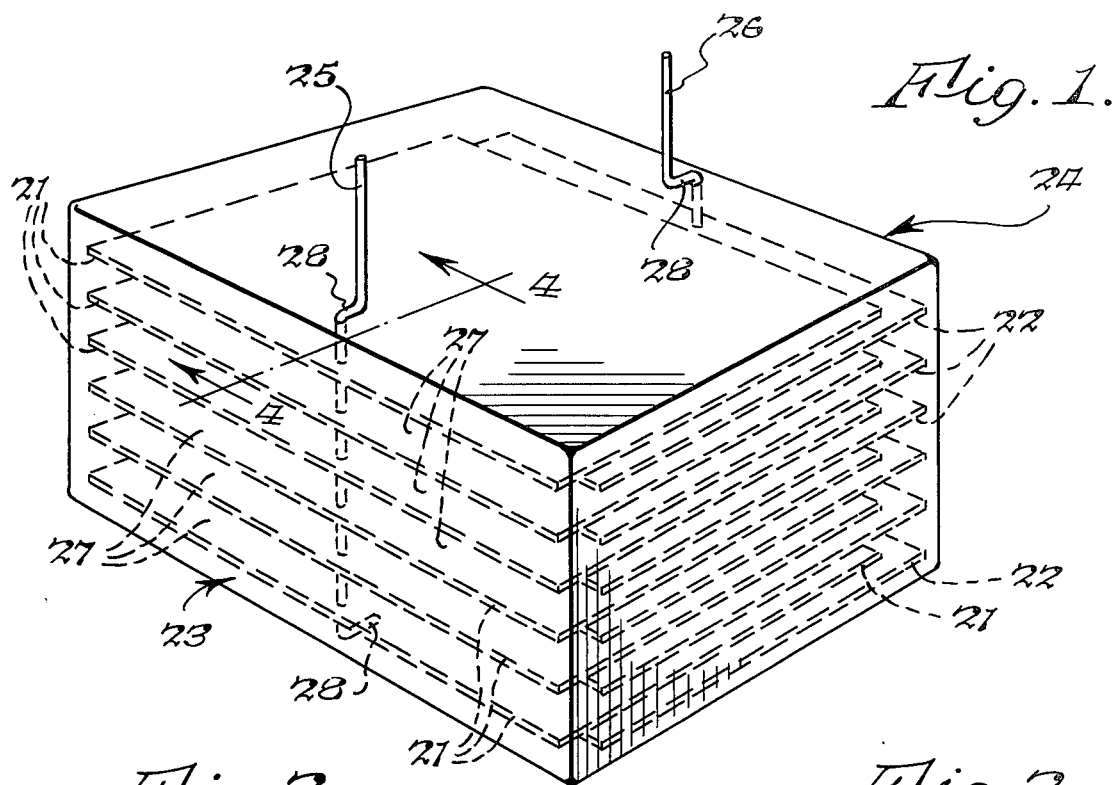
FIG. 1 is a perspective view of a multilayer capacitor according to the present invention.
Figure 4:
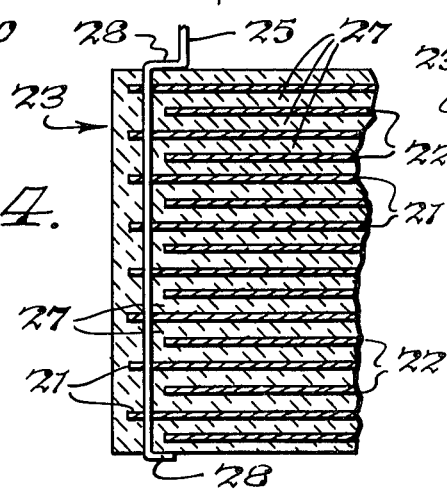
FIG. 4 is a fragmentary, vertical sectional view taken on line 4—4 of FIG. 1.
Figure 5:
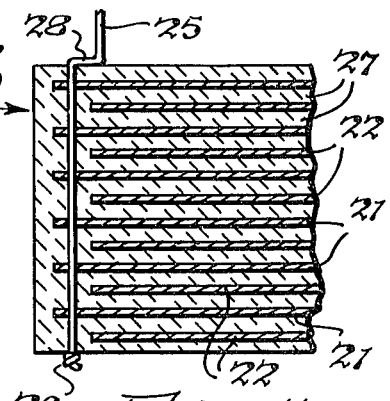
FIG. 5 is a fragmentary, vertical sectional view, similar to FIG. 4, showing a modified wire lead arrangement.

FIG. 1 depicts, as an embodiment, a monolithic, multilayer ceramic capacitor according to the present invention. It comprises a sintered ceramic matrix having vertically spaced, horizontal, metal layers or internal electrodes 21 and 22. The electrodes 21 alternate with the electrodes 22 and while the former extend byeond the latter at one side, 23, off the capacitor, the electrodes 22 extend beyond the metal layers 21 at the other side, 24, of the capacitor. Thus, as more clearly seen from FIG. 4, the lead wire 25, which extends vertically adjacent the side 23 through aligned holes in the dielectric strata 27 of the ceramic matrix that lie above and below the internal electrodes 21, is electrically connected only to the last-mentioned electrodes. In the same manner, the lead wire 26, which extends vertically adjacent the side 24 through a similar set of aligned holes in the dielectric strata 27, is electrically connected to only the internal electrodes 22. The wires 25 and 26, which serve as electrical leads for the capacitor, are held in place, before production of the internal electrodes in the capacitor, as hereinafter described, by crimps or bends 28 where they emerge from the upper face of the body and they may be provided with similar crimps 28 at the ends of the wires where they emerge from the lower face of the body. Alternatively, the free bottom ends of the wires may be provided with knots 29, as shown in FIG. 5. The latter figure is essentially similar to FIG. 4 and shows, fragmentally, a section through a similar but smaller capacitor according to the invention. If desired, knots can also be employed instead of crimps to hold lead wires in place at the upper faces of ceramic matrices.

FIG. 23 is an enlarged, fragmentary section view of a porton of FIG. 5 in which the metal in the vertical hole around the lead wire 25 is clearly shown.

In producing a capacitor like that illustrated in FIG. 1, a process substantially like that disclosed in U.S. Pat. No. 3,679,950, may be employed to form a monolithic sintered matrix, i.e. chip, or small block having a plurality of superposed strata of ceramic dielectric material with intervening electrode regions. The latter, as described in the patent, are porous ceramic strata, each such stratum having a network of interconnected pores. These porous strata are, preferably, substantially the same in size but each successive one in the chip is offset so that it projects toward an edge region of the chip, alternate strata projecting toward the same edge region. Thus, there are provided in the matrix two sets of porous strata, one projecting toward one edge region and the other set projecting toward another edge region. However, unlike the ceramic chips or blocks produced in accordance with the patent disclosure, it is not required that the electrode regions extend to and open at said edge regions of the chips. Consequently, a slight variation is made in the procedure disclosed in the patent for forming the ceramic matrices. This variation consists essentially of so forming and/or placing the leaves or layers of material applied to the leaves of temporarily bonded dielectric ceramic material for producing electrode regions, that successive ones overlap and project toward different edges of the dielectric leaves but each layer or leaf for an electrode region is completely surrounded by a margin of a dielectric leaf. Thus, after compacting and firing the units, e.g. by the procedure of the patent, completely sealed, sintered, ceramic chips are obtained which contain two sets of thin electrode regions into which a conductive material, such as metal, can be introduced.

To permit entry of metal into the electrode regions of the sintered chips described above holes are provided in the chips. The holes in each chip are so located that each of them extends into or through alternate electrode regions therein, but a specific hole does not extend into or through successive electrode regions therein. By this means, access is obtained to the porous strata from the top and/or bottom faces of the fired chips. This is illustrated in FIG. 6. This figure shows, the section, a portion of a ceramic matrix or chip in which a vertical hole 31 containing wire lead 32 communicates with alternate electrode regions 33, the other set of electrode regions 35 being connected the opposite end (not shown) of the chip by another vertical hole (not shown).

FIG. 22 is a similar figure depicting the green, unified body from which the body shown in FIG. 6 was obtained by firing. The layers 33' and 35' between the ceramic strata are pseudoconductors, there being access to the layers 33' from the vertical hole 31'.

The holes in the chips communicating with the electrode regions therein can be bored or punched. Although the holes can be made in the chips after the latter are fired for sintering the ceramic, it is preferred to provide the holes in the green, unifired, ceramic chips. Before introduction of metal into the electrode regions of the fired chips, a lead such as a rod or wire is passed into or through each of the holes and suitably secured in place, as described above. The wires or rods employed are sufficiently smaller in diameter than the holes in which they are inserted so that there is enough space around them for entry of molten metal into the electrode regions of the chips to form the desired internal electrodes.

In introducing metal into the thin electrode regions of the sintered ceramic chips to form internal electrodes, any suitable procedure can be used. For example, the sintered chips having leads attached thereto, as described above, can be immersed in a bath of molten lead held, at a temperature of from about 350° C to about 500° C, in a suitable vessel. The vessel is preferably located in an enclosure in which the pressure can be varied, since entry of molten metal around the wires into the electrode regions of the chips is facilitated by first reducing the pressure in the enclosure to, for example, about 76.5 mm of Hg, and then increasing the pressure after the chips are immersed with the molten metal. The metal will thus be forced into the chips. A pressure of about 14 kg/cm$^2$ has been found to be suitable for this. After introduction of the metal, the chips can be removed from the metal bath and cooled, and the pressure can then be released. Capacitors with leads attached thereto, such as shown in FIG. 1, can thus be obtained without any end termination electrodes and without the necessity for any additional soldering step to attach such leads.

It will be understood that a number of metals other than lead may be employed, according to the invention, in forming internal electrodes in ceramic chips. For example: tin, aluminum, copper, and alloys containing such metals may be used, as desired. Obviously, the metal or alloy used should preferably have a melting point low enough to permit introduction into the chips at moderate temperatures and should not have either a substantial vapor pressure at the temperature employed, or a deleterious effect on the ceramic dielectric material. The minimum pressure used in injecting molten metal into the chips will obviously vary in accordance with the size of the holes and electrode regions involved, the viscosity of the molten metal, and the surface energy of the molten metal relative to the sintered ceramic material of the chips. In general, the metal introduced into the electrode regions of the sintered chips should have a melting point lower than the temperature used in sintering the chips. It will be observed that the internal electrodes and the metal, other than the leads, in the filling holes is solidified from the molten state and thus has the characteristics of cast metal.

FIG. 11 illustrates diagrammatically one of the numerous ways in which the metal internal electrodes can be produced. In this figure, a suitable container or enclosure, indicated schematically by the numeral 39, is provided. In this there is located a vessel 40, formed of suitable material, containing a bath 41 of the molten metal to be used. The metal bath is heated in any suitable manner, by means of not shown, to maintain the metal at the proper temperature. Also located within the enclosure is a carrier. The structure of the carrier may vary widely but preferably it comprises a supporting rod 42 which may be vertically reciprocated. The rod 42 has attached thereto at its lower end a spring clip 43 which releasably holds one or both of the leads 44 associated with a sintered ceramic matrix or chip 45 such as is described above.

After the chip 45 is thus suspended in the enclosure 39, the pressure in the enclosure is reduced by a vacuum pump (not shown) suitably connected thereto and the chip is then lowered by the rod 42 into the molten metal bath 41. The pressure in the enclosure is then raised by suitable means, (not shown), to force the molten metal around the leads 44 into the electrode regions in the chip. Compressed gas from a suitable source may be employed as a pressure medium. The rod 42 is then raised to withdraw the chip 45 from the metal bath and the chip is permitted to cool sufficiently to solidify the metal therein, after which the presure is released. The resulting capacitor may then be removed and replaced with another chip and the metal filling process repeated therewith. It will be understood that other apparatus may be employed for introducing molten metal into sintered ceramic chips; and that modifications in the apparatus shown schematically and/or its use may be made. For example, under some conditions evacuation of the enclosure can be carried out after and not before the chip is immersed in the molten metal bath. Also more carriers can be provided and more than one chip can be immersed in the metal bath at the same time. If desired, the metal introduction apparatus can be automated so that completed capacitors are continuously produced.

FIGS. 8–10 illustrate some other arrangements which can be made to provide leads for multilayer capacitors according to the invention before introducing metal into the electrode regions between the dielectric strata. In the matrix or chip 46 shown in FIG. 8, which is similar to the chip shown in FIG. 6 but rotated horizontally 90°, the holes 47 and 48 in the chip, that pass respectively through the two sets of electrode regions 49 and 50 located between the dielectric strata 51, are larger and are inclined instead of vertical. Thus, after wires or rods (not shown) for leads are inserted in the holes 47 and 48 and molten metal is introduced into the regions 49 and 50 through the holes and around the leads, there will be somewhat greater areas of contact between the wires or rods and the internal electrodes formed by the metal in the electrode regions.

FIGS. 9 and 10 illustrate another modification in which cavities are made in the sides of a green chip before firing and filling the electrode regions therein with metal. Each such cavity in the sintered chip 52, one cavity 54 being shown in FIG. 10, communicates with one set of the electrode regions 55 and 56 located between the dielectric ceramic strata 53. Thus, the cavity 54 communicates with and joins the electrode regions 55, while the similar cavity (not shown) at the opposite end of the chip communicates with the alternate electrode regions 56. After firing and before molten metal is introduced into the electrode regions 55 and 56, the flattened end 57 of a rod or wire 58 is pressed into the somewhat rectangular cavity 54 and a similar flattened rod or wire (not shown) is inserted into the corresponding cavity (not shown) at the opposite end of the chip. The wire or rod ends fit snugly enough in the cavities so that friction holds them in place against moderate effort to remove them. At the same time, however, the fit is not close enough to prevent entrance of molten metal into the cavities around the flattened ends and into the respective electrode regions communicating therewith when the chips are placed in a molten metal bath. After the metal-filled units are removed from the metal bath and cooled, the flattened wire or rod ends are securely held in the cavities and good electrical contact of the leads with the internal metal electrodes formed therein is obtained.

Figure 2:
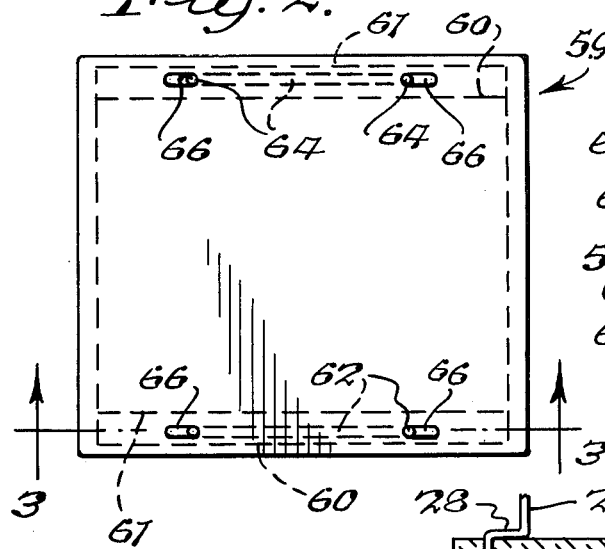
FIG. 2 is a top plan view of a modified form of multilayer capacitor according to the invention.
Figure 3:
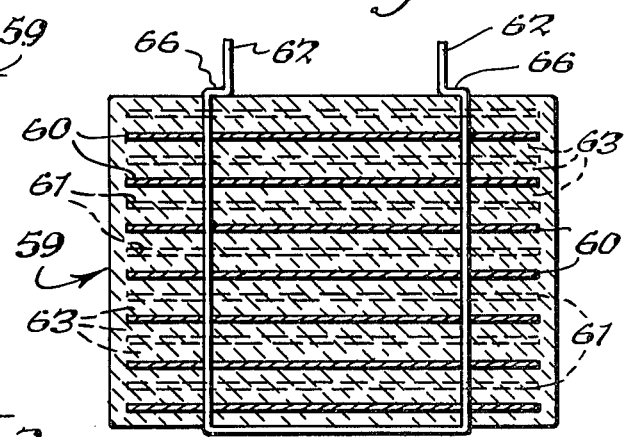
FIG. 3 is a vertical sectional view taken on line 3—3 of FIG. 2.

FIGS. 2 and 3 illustrate still another modification of the present invention. In this modification the multilayer ceramic capacitor 59 is provided with two sets of overlapping and alternating interior metal electrodes 60 and 61. Each of the electrodes 60 extends toward the front of the capacitor beyond the electrodes 61 and each of the electrodes 61 extends toward the rear of the capacitor beyond the electrodes 60; but none of the electrodes is exposed on the exterior of the capacitor. Adjacent the front of the capacitor 59 (FIG. 2) there is provided a lead wire 62 that extends in spaced holes through the sintered ceramic layers or strata 63 and electrodes 60 and across the bottom face of the capacitor with the free ends of the lead projecting from the top face of the capacitor. As will be seen from the drawings, the holes for the lead 62 are so located that the lead contacts the internal electrodes 60 adjacent the edges of their forwardly projecting portions, but does not contact the electrode 61. A lead wire 64, similar to the lead 62, is provided adjacent the rear of the capacitor and passes through aligned holes in the ceramic strata 63 so located that the lead 64 contacts the internal electrodes 61 but not the electrodes 60. The leads 62 and 64 are inserted in the ceramic chips before the latter are injected with metal, and crimps 66 or knots, such as are shown in FIG. 5, are provided in the free ends of the leads to prevent their being displaced before such injection.

In making capacitors such as are shown in FIGS. 2 and 3, processes very similar to those described in the above-mentioned U.S. patent and patent applications can be employed. A green ceramic chip is produced from alternating layers of temporarily bonded ceramic dielectric material and pseudoconductive layers of smaller area. Holes are then bored or otherwise provided through the layers or strata at the desired locations prior to the firing of the chip to sinter together the layers of ceramic dielectric material and to cause the formation of thin, open electrode regions into which metal can be introduced to provide internal electrodes between the dielectric layers of the sintered matrix. The pseudoconductive layers have margins of dielectric material surrounding them and are so located that the opposite edges of successive pseudoconductive layers are offset, thereby forming on firing two sets of open electrode regions, the members of each set being alternated vertically in the fired chip, as in FIGS. 1 and 4. In the embodiment of FIGS. 2 and 3 the holes for the leads are provided in aligned pairs adjacent opposite edges of the chips, one pair of holes extending through and connecting one of the sets of electrode regions and the other pair extending through the second set of electrode regions and connecting them. Obviously, none of the holes will be so placed as to extend through successive electrode regions since this would result in a shorted capacitor. After firing the chips, a wire somewhat smaller in diameter than the holes is passed through each of the pairs of holes with the free ends of each wire projecting from the top surface of the fired chip and with a portion of each wire extending across the bottom face of the chip from one hole of each pair to the other hole of the pair. Using one or both ends of one or both wires to support and carry the chip, the latter is then injected with metal, as described above, to provide internal electrodes in the electrode regions. The wires serve as leads for the completed capacitor since each wire is in electrical contact with one set of internal electrodes.

The capacitor construction shown in FIGS. 2 and 3 in particularly useful where the capacitor is to be attached to a circuit board or a substrate by means of soldering pads. Such use is illustrated in FIGS. 12 and 13 where a substrate 69 of suitable insulating material is provided with spaced metallic soldering pads 70 and 71 on one face thereof, the pads being connected to conductors 72 and 73, respectively. The capacitor 74, constructed substantially like the capacitor 59 of FIGS. 2 and 3, is soldered to the pads 70 and 71 by the portions of the leads 75 and 76, respectively, that extend across the bottom face of the capacitor. Substantial, stable contact areas are thus obtained.

In FIG. 14 there is illustrated one of the various ways in which the wire leads from capacitors according to the present invention, e.g. a capacitor like the one shown in FIG. 1, can be used. As shown, the lead wires 83 and 84 of the capacitor 81 which are connected, respectively, to alternate internal electrodes (not shown) in the capacitor are extended through holes 85 and 86, respectively, provided in a circuit board 82 of suitable insulating material and through corresponding holes in the conductors 87 and 88 provided on the lower surface of the board. The leads maintain the capacitor 81 in position and good electrical contact with the conductors 87 and 88 may be secured by soldering the leads to the latter, as shown at 89.

Although capacitors formed according to the teachings of the present invention are substantially sealed by being enclosed in sintered ceramic material and by reason of the injected metal in the holes for the lead wires filling the space therein around the wires, they can, if desired, be further sealed. Thus, in FIG. 15 a suitable sealing composition 91 is applied around projecting portions of the lead 92 of the capacitor 93. Similarly, in FIG. 16 the entire capacitor 95 can be encapsulated by a sheath 96 of suitable material so as to coat the capacitor and seal around the leads 97 and 98. A known polyurethane or epoxy resin designed for encapsulation of electrical components may be used. These and other suitable sealing and encapsulating compounds are commercially available. It will be understood that capacitors of the type shown in FIGS. 1, 2, 5 and 18 and those produced by providing internal metal electrodes in chips of the types shown in FIGS. 6–9 can be similarly sealed.

As explained above, capacitors according to the present invention do not require end termination electrodes since the metal forming the internal electrodes can be introduced through the holes provided in the sintered ceramic chips for the wire or rod leads. The leads themselves, therefore, provide electrical connections to the two sets of internal electrodes. Consequently, the electrode regions between the ceramic strata need not extends to and open on an outer face portion of the chips. However, if desired, they may so extend, and end terminations can be employed, as explained below, to cover or close the openings into such regions from outer edge faces of the chips.

In FIG. 7 there is shown, in fragmentary section, a ceramic matrix 103, similar to the matrix shown in FIG. 6, in which dielectric, sintered ceramic strata 104 alternate with open or void electrode regions 105 and 106, of smaller area than the ceramic strata, into which metal may be introduced. The regions 105, which alternate with the regions 106, extend to and are open at an edge face 107 of the matrix. The regions 106 similarly extend to and are open at the opposite edge face (not shown) of the matrix 103. Both sets of electrode regions are surrounded by ceramic on three sides. End terminations 109 are provided on the face 107 and on the opposite edge face. They can conveniently be formed of ceramic material such as low melting point glass and can be imprevious since metal to form electrodes in the open or void regions 105 and 106 can be introduced into the matrix 103 through holes containing lead wires (not shown) that extend through the matrix normal to said regions. One such hole 111 adjacent the edge face 107 of the matrix or chip 103 provides access to the open electrode regions 105 and another substantially identical hole (not shown) is provided adjacent the opposite edge face of the chip 103 to establish access to the open electrode regions 106.

If desired, however, the end terminations 109 can be permeable. Permeable end terminations can be produced by firing on the edge face 107 of the chip 103 and the edge face (not shown) opposite thereto coatings of a metal electroding paste such as a commercial silver-palladium paste or by applying to said edge faces a suitable ceramic paste which upon firing provides a porous ceramic coating sintered to the ceramic matrix. Molten metal can be introduced into the electrode regions 105 and 106 through such permeable end terminations, as well as around wire leads (not shown) secured in the holes 111 and the corresponding hole (not shown) communicating with the electrode regions 106, by the injection procedure described above. In the case of permeable metal terminations which are conductive, electrical connections can, if desired, be made therethrough to the internal metal electrodes formed in the electrode regions 105 and 106.

FIGS. 17–19 illustrate still another embodiment of the present invention. In the construction shown in FIGS. 18 and 19 the numeral 119 designates a multi-layer capacitor provided with vertically extending wire or rod leads 121 and 122 extending through vertical holes 120 therein, the leads being crimped above and below the capacitor as shown at 123 to prevent their being easily dislodged.

From the exploded view in FIG. 17, it will be easily understood how such a structure is produced. The numerals 125 denote sheets or films formed of a finely divided dielectric ceramic material, for example, barium titanate, temporarily bonded with a heat-fugitive binding material, such as a resin. On each of the lower four of the sheets 125 there is deposited a pseudo-electrode layer 126 which may be composed completely of heat-fugitive material or may contain inorganic particles or granules mixed with such material. The layers 126 also are preferably temporarily bonded with a heat-fugitive bonding material.

The pseudoconductive or pseudoelectrode layers 126 and dielectric ceramic sheets 125 may be prepared and assembled substantially as described in the above-mentioned U.S. patent or patent applications. It should be noted, however, that for this embodiment not only is it unnecessary to have each pseudoconductive layer extend to an edge of the supporting dielectric ceramic sheet, but it is also unnecessary for successive pseudoconductive layers to have portions that are offset from the adjacent pseudoconductive layers to have portions that are offset from the adjacent pseudoconductive layers. This is a result of providing in each pseudoelectrode layer 126 a void area defined by the relatively large aperture 127. When the several sheets 125 and layers 126 shown in FIG. 17 are assembled, with the apertures 127 in adjacent layers 126 offset and those in alternate layers 126 vertically aligned and consolidated by pressure, e.g. as described in the above-mentioned U.S. patent, material from the adjacent sheets 125 will extrude into the apertures 127 and coalesce therein. When the consolidated body is heated and fired to sintering temperatures, the thermally-fugitive material in the sheets 125 and pseudoconductive layers 126 will be removed and the ceramic material in the sheets 125 will be sintered to form a monolithic ceramic matrix which, as shown in FIGS. 18 and 19, comprises a plurality of dielectric ceramic strata 129 integrally joined together around their edges and by the ceramic material which extruded into the apertures 127. Such extruded ceramic material after firing constitutes nonconductive islands or areas of discontinuity 132 in the open electrode regions that intervene the dielectric strata 129 and in the electrodes 130 and 131 formed in such regions by introducing metal into them.

The size of the apertures 127 in the layers 126 may vary. In general, they should be no larger than is necessary to accomplish their function, which is to allow the coalescence and sintering together of the ceramic sheets above and below them, thus providing insulating islands in the electrode regions through which leads may pass without making contact with the electrode which surrounds the island. If larger than necessary, the apertures result in a lowered capacitance. The electrodes 131 and 132 are preferably metal and can be formed by introducing molten metal, through the holes 120 around the leads 121 and 122, into the electrode regions which result from the removal during heating of the thermally fugitive components of the pseudoconductive layers 126. The introduction of metal into such electrode regions can be accomplished, for example, by the process described above with respect to FIG. 11.

Thus, the capacitor 119 comprises a plurality of dense, sintered ceramic dielectric strata 129 with intervening layers or strata 130 and 131 of metal which form internal electrodes. As will be seen, the insulating islands or areas of discontinuity 132 in the electrodes 130 are vertically aligned while the insulating islands in the electrodes 131 are also aligned but are laterally spaced from the islands in the electrodes 130. The holes 120 are so placed as to extend through the areas of discontinuity. Thus, the lead 121 is electrically connected to the electrodes 130 internally of the capacitor, but not to the electrodes 131 which alternate with the electrodes 130. In the same way, the lead 122 has internal electrical connections with only the electrodes 131. The holes 120 are preferably formed in the green body before firing by boring or punching, but may be drilled after firing the body. Although not normally present in the sheets 125 and layers 126 before assembly and consolidation thereof, the locations of the holes 120 are, for illustration, indicated thereon in FIG. 17 by the numerals 120a.

Monolithic capacitors according to the present invention may vary widely in size. Not only may the dimensions of the capacitor be varied, but the number and thickness of both the dielectric strata and the electrodes therein may also vary. Although in most cases it is preferred to make the dielectric strata thicker than the conductive layers or electrodes, this is subject to variation as desired. Capacitors as small as 2.0 mm × 3.0 mm × 0.9 mm with 20 dielectric strata as thin as about 0.03 mm and 19 internal electrodes as thin as about 0.0025 mm can be readily made, and larger ones are, of course, possible. Capacitors of any desired capacitance may be obtained, according to the invention, by proper choice of dielectric material and the size, thickness, and number of the strata and electrodes. It will be understood that capacitors according to the present invention may be adjusted in thickness and/or given additional mechanical strength by providing extra or additional dielectric sheets or layers on the tops and/or bottoms of the green chips. Unprinted leaves of a dielectric ceramic composition can be used for such purpose. However, the presence of a thermally-fugitive deposit on the top dielectric film or leaf of such a stack will ordinarily not be detrimental.

In general, is it desirable to form the dielectric strata and electrodes as thin as is feasible since a smaller amount of expensive dielectric material is used and the capacitance per unit of volume of the capacitors is increased, thus reducing the space required in circuits. It will be understood that the thinness of the dielectric strata is limited by the necessity of having such strata solid and non-porous and of such thickness as to withstand the voltage applied in use. Although irregularities in the surface or the thickness of the leaves of dielectric material may provide problems in the formation of capacitors where extremely thin layers or films of pseudoconductive material are applied since one or more cavities between such irregular leaves may be blocked after firing, it is generally preferred to make the electrodes or conductive layers thinner than the dielectric strata.

The size of the leads provided for multilayer capacitors produced in accordance with the present invention may vary considerably. In general, it is preferred to employ wire from about 0.25 mm to about 0.65 mm in diameter for leads. However, larger or smaller wires can be used where convenient or necessary. Thus, in capacitors made from ceramic matrices such as shown in FIGS. 9 and 10, the leads are generally larger since the ends thereof are flattened for substantial contact with the metal layers in the capacitor. In large capacitors the leads can be rods or the like, if desired. The holes for the leads in the fired chips are preferably only slightly larger in diameter than the leads. In general, to ensure good contact between the leads and the metal forming the internal electrodes, it is desirable to have the leads wet by the molten electrode metal. Copper wire has been found satisfactory in most instances although a variety of other metal wires can be used. It will be understood that the holes in the matrices produced in accordance with this invention may merely communicate with an electrode region and not extend through into the succeeding dielectric stratum.

The capacitors and the matrices heretofore described and shown herein are rectangular. The present invention, however, comprehends the production of capacitors of other shapes. Thus, if desired, they can be of triangular, hexagonal, oval, or any other desired shape provided there are therein a plurality of sets of distinct electrodes, each set of which is provided with one or more projecting leads in electrical contact with the electrodes of the set.

It will be understood that multilayer capacitors according to the present invention may be formed using for the dielectric strata any of the ceramic compositions disclosed in the above-mentioned U.S. patent and patent applications as suitable for the production of such strata and that the electrode regions therein may be produced by employing any of the suitable compositions disclosed in said patent and applications for such use. However, other suitable compositions can be employed if desired. It is preferred that the compositions used for forming the dielectric layers comprise a finely divided ceramic material that is sinterable to form a dense ceramic body. They also preferably include a thermally-fugitive bond. The layers or deposits used to form the pseudoconductors or pseudoelectrodes in the green bodies may, as pointed out above, be formed of any of the compositions disclosed in the above-mentioned U.S. patent and patent applications for such use, or other suitable compositions. Preferably such pseudoconductive layers contain thermally-fugitive material. In any event, the space occupied by the pseudoconductors should, after firing of the body, constitute a void or open region, i.e. one which is at least about 40 volume percent void and which can be filled with molten metal to form electrodes.

As used herein, the term "dense" means that the material absorbs substantially no water when immersed therein; and "thin" is a relative term which with reference, for example, to the ceramic strata indicates a thickness of the order of 0.5 mm or less. Such strata can, however, for specific purposes, be thicker. A "thermally-fugitive" or "heat-fugitive" material, as the terms are used herein, is one which under the conditions of the processes herein described volatilizes such as or is wholly converted, with or without oxidation, into products that volatilize.

As previously pointed out, the novel process disclosed herein by which multilayer ceramic capacitors are formed can be easily adapted to the production of multilayer ceramic circuit boards or structures. Such boards, widely utilized in hybrid integrated circuits, have conductors for connection of components at a plurality of levels in a ceramic substrate or matrix.

FIGS. 20 and 21 illustrate a multilayer ceramic circuit board made according to the present invention. The circuit board 135 comprises three strata 136 of dielectric or insulating ceramic which are integrally sintered together to form a ceramic matrix. In this matrix there are three internal conductors 137, 138 and 139, preferably formed of metal. Leads 140, 141, 142, 143 and 144 extend from the exterior of the circuit board to one or more of the internal conductors which, as shown, are on two levels and have ceramic strata 136 above and below them. The strata 136 are sintered together not only around their edges, but around and between the conductors.

In forming the circuit board 135, essentially the same process may be used as is described above for forming capacitors. Three sheets of temporarily bonded, e.g. with a resin, finely divided dielectric or insulating ceramic material are assembled with pseudoconductive layers between the sheets at the places where internal conductors are desired and compacted. Such pseudoconductors or pseudoconductive layers may be formed like those used in producing capacitors as above described and preferably comprise a substantial amount of thermally-fugitive material. Holes for leads and the entrance of metal are provided, e.g. by boring or punching, in the composite green body. Such holes pass through the top and/or bottom ceramic stratum 136 and enter or pass through one or more of the pseudoconductive layers. Upon firing the compacted assembly, the thermally-fugitive binder for the dielectric or insulating ceramic material and the thermally-fugitive components of the pseudoconductive layers disappear and the ceramic material of the sheets is sintered to form a unitary ceramic matrix in which regions, like the electrode regions formed in the corresponding process for producing capacitors, which can be filled with molten metal to obtain interior conductors, replace the pseudoconductive layers. Molten metal can be introduced into such regions in the same way as above described through the holes passing through the top and/or bottom ceramic stratum. As in the capacitor production described above, leads which may be rods or wires are inserted in the holes before introduction of the molten metal and such introduction can be carried out with apparatus such as is shown diagrammatically in FIG. 11. It will be noted that the leads may take various forms and may extend through or merely into one or more internal conductors. The leads can be crimped or as shown at 146 may be reduced in size within the circuit board. As in the production of capacitors, the wires or rods used for leads are slightly smaller in cross section than the holes into which they are inserted, thus permitting entry of molten metal around them to form the internal conductors. A variety of metals and metal alloys can be used but one which has a melting point lower than the temperature used in sintering the matrix and lower than the leads should be used.

I claim:

1. A process for forming a multilayer capacitor which comprises: providing a unitary, sintered ceramic matrix comprising a plurality of superposed thin strata of dense dielectric material, said strata being integrally joined around the peripheries thereof to form a monolithic body, major portions of a plurality of said strata being spaced to provide between said spaced portions thin, void electrode regions adapted to be filled with metal, said matrix having a pair of laterally spaced first holes passing through the top or bottom stratum thereof, and second holes aligned with said first-mentioned holes passing through other of said strata to provide access from the exterior of said matrix to said void electrode regions; securing wire leads in said holes with an end of each wire projecting from said body, providing electrodes in said electrode regions by introducing molten metal into said regions through said holes and around said leads and solidifying the metal therein in electrical contact with said leads, said metal having a melting point lower than the temperature employed for sintering said matrix and lower than the melting point of said leads.

2. A process as set forth in claim 1 in which each of said first holes and the respective holes aligned therewith provide access to one set only of a plurality of sets of electrode regions, each of said sets consisting of alternate electrode regions.

3. A process as set forth in claim 1 in which there is in each of said electrode regions an island of said dense ceramic material, integral with said adjoining strata and each of said islands is provided with a second hole therethrough aligned with one of said first holes.

4. A process as set forth in claim 1 in which said void electrode regions have their marginal edges wholly within said matrix.

5. A process as set forth in claim 1 in which said matrix is supported by one of said leads while molten metal is introduced into said void electrode regions.

6. A unitary, sintered ceramic body suitable for use in making electrical components having internal conductive layers which comprises: a plurality of superposed thin strata of dense, ceramic, dielectric or insulating material, said strata integrally joined around the peripheries thereof to form a monolithic body, major portions of a plurality of said strata being spaced to provide between said spaced portions thin, void electrode regions adapted to be filled with metal, said body having a pair of laterally spaced holes passing through the top or bottom stratum thereof and holes aligned with said first-mentioned holes, each of said second-mentioned holes passing through at least one other of said strata to provide access from the exterior of said body to said void electrode regions, and a conductor secured in each of said holes.

7. A unitary, sintered ceramic body as defined in claim 6 wherein there is access from any one of said first-mentioned holes to one only of void electrode regions that are immediately adjacent to each other.

8. A unitary, sintered ceramic body as defined in claim 7 wherein said electrode regions are thinner than the ceramic strata adjacent thereto.

9. A unitary, sintered ceramic body as defined in claim 6 wherein each of said first-mentioned holes and the holes aligned, respectively, with each provide access to one set only of a plurality of sets of void electrode regions, each of said sets consisting of alternate void electrode regions.

10. A unitary, sintered ceramic body as defined in claim 6 wherein said thin, void electrode regions have a thickness in the range from about 0.00254 mm to about 0.0254 mm.

11. A unitary, sintered ceramic body as defined in claim 6 wherein said conductor projects outwardly from said body.

12. A unitary, sintered ceramic body as defined in claim 7 wherein said conductor projects outwardly from said body.

13. A unitary, sintered ceramic body as defined in claim 9 wherein said conductor projects outwardly from said body.

14. A unitary, sintered ceramic body as defined in claim 9 wherein a conducting wire or rod is carried in each of said first-mentioned holes and the holes aligned, respectively, therewith, said wires or rods being slightly smaller in cross section than said holes.

15. A unitary, sintered ceramic body as defined in claim 14 wherein at least one of said wires or rods projects outwardly from said body.

16. A unitary, sintered ceramic body as defined in claim 6 wherein there is in each of said electrode regions an island of said dense ceramic material integral with said adjoining strata, and each of said islands is provided with a hole therethrough aligned with one of said first-mentioned holes.

17. A unitary, sintered ceramic body as defined in claim 6 wherein said electrode regions have their marginal edges wholly within said matrix.

18. A process as set forth in claim 1 in which said wire leads are secured in said holes in such manner that both ends of each wire project from said body.

19. A process as set forth in claim 18 in which each of said first holes and the respective holes aligned therewith provide access to one set only of a plurality of sets of electrode regions, each of said sets consisting of alternate electrode regions.

20. A process as set forth in claim 18 in which there is in each of said electrode regions an island of said dense ceramic material, integral with said adjoining strata and each of said islands is provided with a second hole therethrough aligned with one of said first holes.

21. A process as set forth in claim 18 in which said void electrode regions have their marginal edges wholly within said matrix.

22. A process as set forth in claim 18 in which said matrix is supported by one of said leads while molten metal is introduced into said void electrode regions.

* * * * *

UNITED STATES PATENT AND TRADEMARK OFFICE
CERTIFICATE OF CORRECTION

PATENT NO. : 4,071,878

DATED : January 31, 1978

INVENTOR(S) : James A. Stynes

It is certified that error appears in the above-identified patent and that said Letters Patent are hereby corrected as shown below:

Column 4, line 25, "byeond" has been changed to -- beyond --.

Column 5, line 29, "the" has been changed to -- in --.

Column 5, line 32, after "connected", -- adjacent -- has been inserted.

Column 5, line 44, "unifired" has been changed to -- unfired --.

Column 8, line 49 "in" has been changed to -- is --.

Column 10, line 64, after "intervene", -- between -- has been inserted.

Column 13, line 5 "such as" has been changed to -- as such --.

Signed and Sealed this

Sixth Day of June 1978

[SEAL]

Attest:

RUTH C. MASON
Attesting Officer

DONALD W. BANNER
Commissioner of Patents and Trademarks